(12) United States Patent
Holt et al.

(10) Patent No.: US 6,226,531 B1
(45) Date of Patent: May 1, 2001

(54) HIGH CAPACITY BROADBAND CELLULAR/PCS BASE STATION USING A PHASED ARRAY ANTENNA

(75) Inventors: Brian P. Holt, Melbourne; Robert C. Hildebrand, Indialantic; Julian Bartow Willingham, Melbourne, all of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/138,491

(22) Filed: Aug. 24, 1998

(51) Int. Cl.[7] .............................. H04B 1/38; H04M 1/00
(52) U.S. Cl. ..................... 455/562; 455/561; 455/280; 342/380; 342/381
(58) Field of Search ........................... 455/561, 562, 455/278.1, 279.1, 280, 447, 446; 342/380, 383, 381, 378

(56) References Cited

U.S. PATENT DOCUMENTS

| | | | |
|---|---|---|---|
| 4,901,307 | * 2/1990 | Gilhousen et al. | 370/320 |
| 5,437,054 | 7/1995 | Rappaport et al. | 455/33.1 |
| 5,488,737 | * 1/1996 | Harbin et al. | 455/562 |
| 5,548,813 | 8/1996 | Charas et al. | 455/33.3 |
| 5,579,016 | 11/1996 | Wolcott et al. | 342/378 |
| 5,592,480 | * 1/1997 | Carney et al. | 370/347 |
| 5,596,333 | * 1/1997 | Bruckert | 342/457 |
| 5,778,324 | * 7/1998 | Smith | 455/562 |
| 5,907,816 | * 5/1999 | Newman et al. | 455/562 |
| 5,953,325 | * 9/1999 | Willars | 370/335 |
| 6,002,947 | * 12/1999 | Smith | 455/562 |

OTHER PUBLICATIONS

Prolog to and article entitled "Applications of Antenna Arrays to Mobile Communications, Part I: Performance Improvement, Feasibility, and System Considerations", Lal C. Godara; Proceedings of the IEEE, vol. 85, No. 7, Jul., 1997, pp. 1029–1060.

"Application of Antenna Arrays to Mobile Communications, Part II: Beam–Forming and Direction–of–Arrival Considerations", by Lal C. Godara, from Proceedings of the IEEE, vol. 85, No. 8, pp. 1195–1237.

* cited by examiner

Primary Examiner—Dwayne Bost
Assistant Examiner—Temica M. Davis
(74) Attorney, Agent, or Firm—Allen, Dyer, Doppelt, Milbrath & Gilchrist, P.A.

(57) ABSTRACT

A high capacity broadband base station employs a wideband radio and phased array processing subsystem. This phased array antenna subsystem contains multiple sets or pairs of alternating receive only and transmit/receive elements distributed in a two dimensional spatial array. Each digital wideband radio performs both receive and transmit channel signal processing. In the receive direction, the digital representation of the entire spectrum for each antenna element is divided into channels for the particular waveform of interest. For a 5 MHz PCS GSM, the digital wideband radio separates twenty-four carriers into twenty-four (200 KHz wide) data streams, each of which is representative of a respective channel, and couples each channel to a digital signal processor. In the transmit direction, the radio combines the digital representations of the twenty-four individual channels supplied by the DSP into a single wideband channel for transmission.

4 Claims, 2 Drawing Sheets

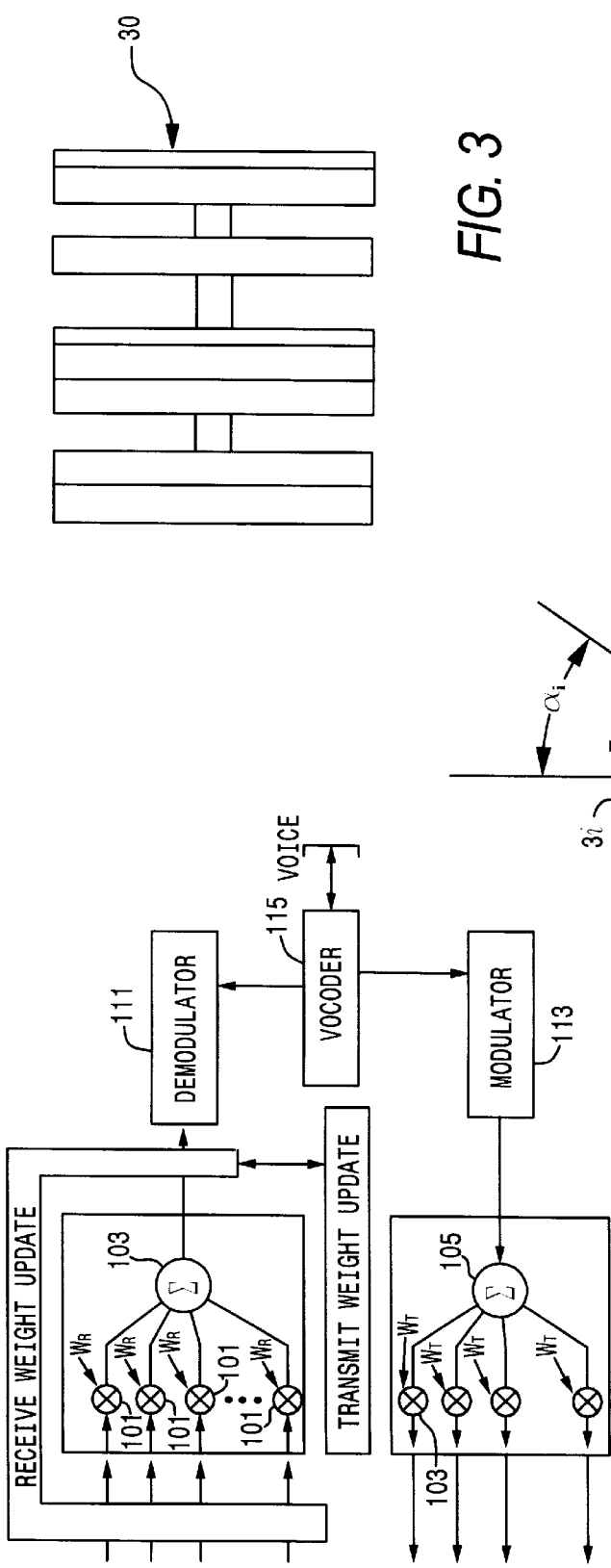
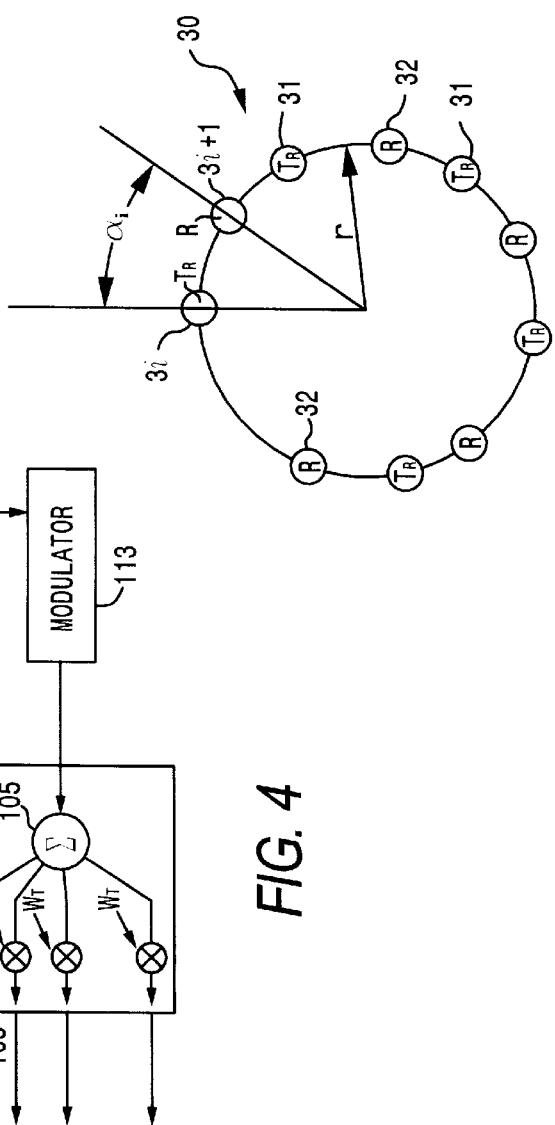
FIG. 3
FIG. 2
FIG. 4

HIGH CAPACITY BROADBAND CELLULAR/PCS BASE STATION USING A PHASED ARRAY ANTENNA

FIELD OF THE INVENTION

The present invention relates in general to wireless communication systems, such as but not limited to cellular communication systems, and is particularly directed to a scheme for increasing the capacity of broadband base station without a significant increase in hardware, by combining a set of wideband digital radios with a phased array antenna to provide higher channel reuse and higher trunking efficiency.

BACKGROUND OF THE INVENTION

A conventional 'omni' broadband personal communication system (PCS)/cellular base station, which employs a wideband digital transceiver and associated omnidirectional antennas, cannot provide high capacity in a multiple base station environment. Due to the presence of co-channel interferers, the base station either has no neighbors or has a high channel reuse factor (e.g., K=11 or greater). Unfortunately, a high reuse factor means that only a small fraction (e.g., on the order of one-tenth) of the available power of the receiver is being used.

As a consequence, an omni base station suffers a significant cost disadvantage compared with those that employ narrowband systems operating at only a limited number of channels, since receiver cost is the same regardless of whether it is being fully utilized. For example, for a 5 MHz PCS GSM system, twenty-four RF channels having eight voice channels per RF channel provides 192 total channels. At a frequency reuse factor of K=11, two RF channels at eight voice channels/RF channel provides sixteen available channels, resulting in an Erlangs/base station at a grade of service of 0.02 equal to 9.83.

One way to increase capacity is to implement a sectorized wideband base station employing directional antennas to subdivide the spatial coverage (e.g., into three 120 sectors). Although reducing the number of potential interferers, this approach suffers from reduced channel use (e.g., K=4, which allows use of only one-fourth of the available channels). In addition, a sectorized wideband radio suffers trunking efficiency loss. For example, for the above 5 MHz PCS GSM example, at K=4, six RF channels at eight voice channels per RF channel yields 48 total channels, or 16 channels per sector for three 120° spatial sectors. At an Erlangs/sector of 9.83, the resulting Erlangs/base station is somewhat improved over that of a conventional omni base station at (9.83×3)=29.49 Erlangs.

SUMMARY OF THE INVENTION

In accordance with the present invention, a high capacity broadband base station may be realized without a significant increase in hardware, by combining wideband digital radio equipment with a phased array antenna, so as to provide dynamic beam steering via the phased array. As a result, the capacity of the base station is increased significantly.

For this purpose, the phased array broadband PCS/cellular base station architecture of the present invention comprises a phased array antenna subsystem coupled to a wideband radio and array processing subsystem. The phased array antenna subsystem contains multiple sets or pairs of alternating receive only and transmit/receive elements distributed in a two dimensional spatial array. Each transmit/receive antenna element is coupled through an associated diplexer to wideband receiver—transmitter pair. Each receive only antenna element is coupled to an associated wideband receiver. The receivers' RF outputs are downconverted via a broadband downconverter to intermediate frequency signals. The input to each transmitter is coupled to the output of a broadband IF-RF upconverter.

The IF output signals of the respective downconverters are digitized for application to downstream digital signal processing in an associated wideband digital radio. In the transmit direction, digital IF signals from the wideband digital radio are converted into analog format. Each digital wideband radio performs both receive and transmit channel signal processing. In the receive direction, the digital representation of the entire spectrum for each antenna element is divided into channels for the particular waveform of interest. For a 5 MHz PCS GSM, the digital wideband radio separates twenty-four carriers into twenty-four (200 KHz wide) data streams, each of which is representative of a respective channel, and couples each channel to a digital signal processor (DSP). In the transmit direction, the radio combines the digital representations of the twenty-four individual channels supplied by the DSP into a single wideband channel for transmission.

The array processing modules employed by the DSP include a set of weighting coefficient multipliers, whose respective (amplitude and phase) weighting coefficients are periodically updated by a receiver weighting coefficient calculation algorithm. The resulting weight vector is multiplied by the received signal components and summed to provide a composite signal to a downstream demodulator. The demodulator output feeds a vocoder, with which voice signals are bidirectionally interfaced.

In the transmit direction the DSP receives the serial data stream supplied by a modulator, which receives its input from the vocoder. For outgoing signals, the DSP and executes a transmit array processing module, which contains a set of weighting coefficient multipliers. These transmit weighting coefficient multipliers are coupled to divide channels from a signal splitter to which the output of modulator is applied. The transmit weighting coefficients may be derived from the received steering vector using a transformation operator. The outputs of the multipliers constitute the respective channels to be transmitted.

For the above example of a 5 MHz PCS GSM system, the phased-array broadband base station system of the invention reduces co-channel interference substantially, allowing higher frequency reuse. A reuse factor of K=3 allows eight RF channels times eight voice channels per RF channel, for a total of sixty-four channels. This results in an Erlangs/base station at a grade of service of 0.02 equal to 53.4.

BRIEF DESCRIPTION OF THE DRAWINGS

FIG. 2 is a diagrammatic plan view of a phased array antenna of the type described in co-pending U.S. patent application, Ser. No. 09/081,476;

FIG. 3 is a diagrammatic side view of a phased array antenna of the type described in co-pending U.S. patent application, Ser. No. 09/081,476; and FIG. 4 diagrammatically illustrates array processing modules employed by the digital signal processor of the base station of FIG. 1.

DETAILED DESCRIPTION

Figure 1:
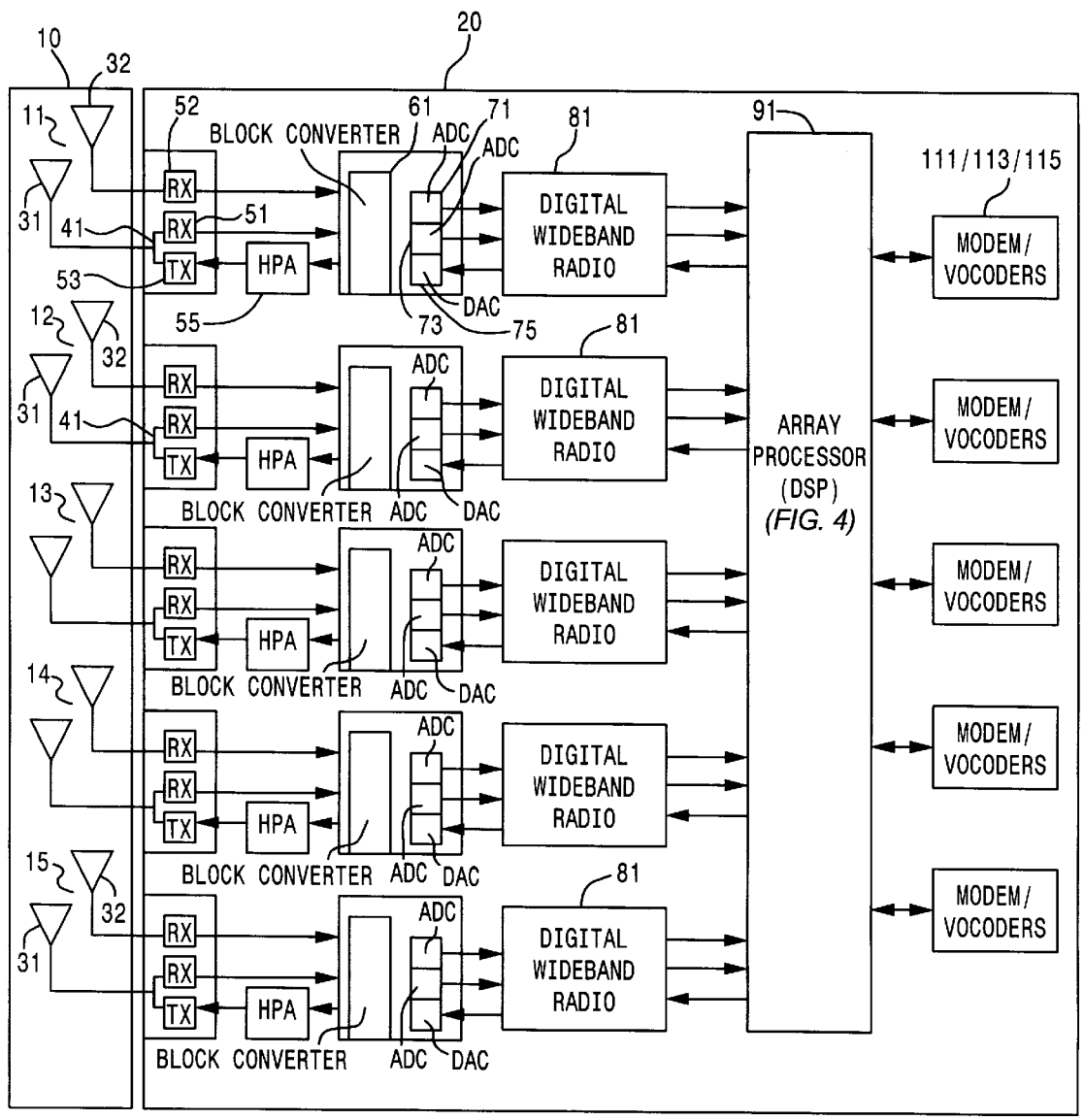
FIG. 1 is a diagrammatic illustration of the architecture of a broadband base station in accordance with the present invention.

Before describing in detail the new and improved high capacity broadband PCS/cellular base station architecture in accordance with the present invention, it should be observed that the invention resides primarily in what is effectively a prescribed arrangement of conventional communication circuits and associated signal processing components and attendant supervisory control circuitry therefor, that controls the operations of such circuits and components.

Consequently, the configuration of such circuits and components, and the manner in which they are interfaced with other communication system equipment have, for the most part, been illustrated in the drawings by readily understandable block diagrams. These diagrams show only those specific details that are pertinent to the present invention, so as not to obscure the disclosure with details which will be readily apparent to those skilled in the art having the benefit of the description herein.

Thus, the block diagram illustrations are primarily intended to show the major components of the system in a convenient functional grouping, whereby the present invention may be more readily understood. For purposes of providing a non-limiting example of a communication system in which the present invention may be employed, the description to follow will describe its application to an industry standard GSM time division multiple access (TDMA) cellular system. It should be understood that the invention is not limited to use with this or any other system, but is effectively applicable to any type of cellular communication system.

Referring now to FIG. 1, the architecture of a high capacity broadband base station in accordance with the present invention is diagrammatically illustrated as comprising a phased array antenna subsystem 10 that is coupled to a wideband radio and array processing subsystem 20. In the non-limiting illustrated example, the phased array antenna subsystem 10 is shown as containing five sets or pairs 11–15 of antenna elements distributed in a two dimensional spatial array, such as a circular array. Each antenna element may be vertically or horizontally polarized, or both, and the spacings among the elements of the array may be uniform or non-uniform. In addition, each antenna element preferably has gain in elevation.

In accordance with a preferred embodiment of the present invention, the phased array antenna subsystem 10 may be of the type described in co-pending U.S. patent application, Ser. No. 09/081,476, filed May 19, 1998, by R. Hildebrand et al, entitled "Circular Phased Array Antenna Having Non-Uniform Angular Separations Between Successively Adjacent Elements," assigned to the assignee of the present application and the disclosure of which is incorporated herein.

As diagrammatically illustrated in the plan view of FIG. 2 and the side view of FIG. 3, this phased array antenna subsystem architecture contains a plurality of (e.g., ten in the present example) antenna elements unequally distributed in a two-dimensional array, shown as a generally non-linear array, such as a circular array 30. Five alternating ones of the antenna elements 31 are shown as being used as both transmit and receive elements, while the remaining five alternating ones of the antenna elements 32 are shown as being used as receive only elements. The antenna elements are oriented to produce a directivity pattern generally parallel to the plane of the array. Preferably, the diameter of the array 30 is at least an order of magnitude greater than the wavelength of the carrier center frequency of interest.

The unequal angular spacing between successively adjacent antenna elements $3_i$ and $3_{i+1}$ is defined so as to decorrelate the separations thereamong, such that for any radial line 'r' intersecting an element of the array 30, the vector distance from any point along that radial direction to any two elements of the array is unequal and uniformly distributed in phase (modulo $2\pi$). To implement this decorrelating vector distance criterion, the angular separation between any two successively adjacent antenna elements $3_i$ and $3_{i+1}$, as one proceeds around the array 30, may vary in accordance with an Nth root of two, wherein N is the total number N of antenna elements in the array.

In particular, the angular separation between successive ones of the N antenna elements of the array is such that, for one element located at any arbitrary location along the array, the angular spacing $\alpha_1$ of a second element relative to the first element is defined by $\alpha_1 = 2\pi*(2^{1/N}-1)$. The angular spacing $\alpha_j$ of each additional element relative to the first element is defined by $\alpha_j = \alpha_{j-1}*2^{1/N}$, where j varies from 2 to N. In order to be able to place a null on each of the potential interferers in adjacent cells that may be simultaneously transmitting during a desired user's time slot, N is at least one more than the maximum number of potential interferers.

Referring again to FIG. 1, each of the transmit/receive antenna elements 31 is coupled (through an associated low noise amplifier, not shown) to an associated diplexer 41 which, in turn is coupled to a receiver 51 and a transmitter 53. The low noise amplifier (LNA) sets of the noise figure and provides sufficient gain for broadband operation. Diplexer 41 operates in a conventional manner to separate the signals coupled to its transmit and receive ports and filter the transmitted signals from the received signals. Transmit power for the transmitter 53 is provided by way of a high power amplifier 55. Similarly, each receive only antenna element 32 is coupled through an associated LNA (not shown) to an associated receiver 52.

The output of each of the receivers 51 and 52 is coupled to an associated (single stage or multiple stage) broadband downconverter, within a block converter 61. The downconverter frequency-translates and provides requisite filtering of spurious signals on all channels received by receive only antenna 31 to intermediate frequency (IF) signals. The input to each transmitter's HPA 55 is coupled to the output of a (single stage or multiple stage) broadband upconverter within the block converter 61. The upconverter frequency-translates and provides requisite filtering of spurious signals on all transmitted channels from intermediate frequency (IF) signals to the transmit channel RF frequency.

The IF output signals of the respective downconverters within the block converter 61 are digitized by respective analog-to-digital converters (ADCs) 71 and 73 (at a sample rate to meet Nyquist criteria for the highest frequency signal of interest in the band) for application to downstream digital signal processing in an associated wideband digital radio 81. In the transmit direction, digital IF signals from the wideband digital radio 81 are converted into analog format by respective digital-to-analog converters (DACs) 75, the outputs of which are coupled to the upconverters within block converters 61.

Each digital wideband radio 81 performs both receive and transmit channel signal processing. In the receive direction the digital wideband radio 81 divides the digital representation of the entire spectrum for each antenna element into channels for the particular waveform of interest. For the previously referenced non-limiting example of 5 MHz PCS GSM, digital wideband radio 81 separates the twenty-four carriers into twenty-four (200 KHz wide) data streams, each of which is representative of a respective channel, and couples each channel to a digital signal processor (DSP) 91, which functions as an array processor, as will be described, with reference to FIG. 4. In the transmit direction, the radio 81 combines the digital representations of the individual ones of the twenty-four channels supplied by DSP 91 into a single wideband channel for transmission.

The array processing modules employed by DSP 91 are diagrammatically illustrated in FIG. 4 as including a set: of weighting coefficient multipliers 101, respective amplitude and phase weighting coefficients $(W_A, W_\Phi)_i$ for which are updated periodically in accordance with the execution of an embedded receiver weighting coefficient calculation algorithm. The resulting weight vector is multiplied by the received signal components and summed in a summing unit 103 to provide a composite signal to a downstream demodulator 111. The output of demodulator 111 is coupled to a vocoder 115 with which voice signals are bidirectionally interfaced.

Although the weighting coefficient update algorithm employed to set the receiver weighting coefficients is not limited to any particular implementation, non-limiting examples that may be employed include the PSF algorithm described in U.S. Pat. No. 4,255,791 to P. Martin, and the "Maximum SNR Method," described in the text "Introduction to Adaptive Arrays," by R. Monzingo et al, published 1980, by Wiley and Sons, N.Y. In addition, other conventional algorithms, such as, but not limited to SMI, LMS, CMA and conjugate gradient, may be used.

Alternatively, and in accordance with a preferred embodiment of the present invention, the weighting coefficient update mechanism may execute an antenna directivity pattern control algorithm of the type described in co-pending U.S. Patent application, Ser. No. 09/081,460, by P. Martin et al, entitled "Bootstrapped, Piecewise-Optimum Antenna Directivity Control Mechanism," filed May 19, 1998, assigned to the assignee of the present application and the disclosure of which is incorporated herein.

In the transmit direction, the DSP 91 receives the to be transmitted serial data stream supplied by a modulator 113, whose input is coupled to the vocoder 115. For outgoing signals, the DSP executes a transmit array processing module, diagrammatically illustrated in FIG. 4 as a set of weighting coefficient multipliers 103. These transmit weighting coefficient multipliers are coupled to divided channels from a signal splitter 105 to which the output of modulator 113 is applied. The transmit weighting coefficients may be derived from the received steering vector using a transformation operator. The outputs of the multipliers 103 constitute the respective channels to be transmitted.

For the above example of a 5 MHz PCS GSM system, the phased-array broadband base station system of the invention reduces co-channel interference substantially, allowing higher frequency reuse (K=3). A reuse factor of K=3 allows eight RF channels times eight voice channels per RF channel, for a total of sixty-four channels. This results in an Erlangs/base station for a grade of service of 0.02 equal to 53.4. Cell size is increased by seven dB increased effective isotropic radiated power (EIRP). The increase in cell size allows fewer base stations to cover the same area, thus reducing the overall system cost.

As will be appreciated from the foregoing description, the present invention provides a high capacity broadband, base station without a significant increase in hardware, by combining wideband digital radio equipment with a phased array antenna, to provide dynamic beam steering via at phased array, thereby significantly increasing the capacity of the base station.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A high capacity broadband base station for a cellular communication system comprising a digital wideband radio coupled to a phased array array subsystem, said phased array antenna subsystem containing multiple sets of alternating receive only and transmit/receive antenna elements distributed in a two dimensional spatial array, and wherein said digital wideband radio is operative to perform both receive and transmit channel signal processing, such that in the receive direction, the digital representation of the entire spectrum for each antenna element is divided into channels for a particular waveform of interest, and in the transmit direction, said digital wideband radio is operative to combine digital representations of individual channels into a single wideband channel for transmission.

2. A high capacity broadband base station for a cellular communication system comprising a digital radio subsystem, coupled to a phased array antenna subsystem containing multiple sets of alternating receive only and transmit/receive antenna elements distributed in a multi-dimensional spatial array, said digital radio subsystem being operative to perform both receive and transmit channel signal processing, such that in the receive direction, the digital representation of the entire spectrum for each antenna element is divided into receive channels for a particular waveform of interest, and in the transmit direction, said digital radio subsystem is operative to combine digital representations of individual channels into a single transmission channel.

3. A high capacity broadband base station according to claim 2, further including an array processor coupled to said digital radio subsystem and being operative to controllably define a narrow beam of said phased array antenna subsystem.

4. A high capacity broadband base station according to claim 2, further including an array processor coupled to said radio subsystem and being operative to generate amplitude and phase weighting coefficients for defining transmit and receive directivity patterns for said phased array antenna subsystem.

* * * * *

UNITED STATES PATENT AND TRADEMARK OFFICE
CERTIFICATE OF CORRECTION

PATENT NO. : 6,226,531 B1
DATED : May 1, 2001
INVENTOR(S) : Brian P. Holt, Robert C. Hilderbrand, Julian Bartow Willingham It is certified that error appears in the above-identified patent and that said Letters Patent is hereby corrected as shown below:

Column 1,
Line 40, delete "120" insert -- 120° --

Column 2,
Line 34, delete "the DSP and" insert -- the DSP --

Column 4,
Line 25, delete "(LNA) sets of the noise" insert -- (LNA) sets the noise --

Column 5,
Line 7, delete "set: of" insert -- set of --

Column 6,
Line 7, delete "via at phased" insert -- via a phased --
Line 21, delete "array array subsystem," insert -- array antenna subsystem, --

Signed and Sealed this

Twenty-ninth Day of January, 2002

Attest:

JAMES E. ROGAN
Attesting Officer *Director of the United States Patent and Trademark Office*